United States Patent [19]

Imaida et al.

[11] Patent Number: 5,225,211
[45] Date of Patent: Jul. 6, 1993

[54] HOT RUNNER INJECTION MOLDING MACHINE

[75] Inventors: Hiroshi Imaida, Okazaki; Tsujihiko Yasuda, Nagoya, both of Japan

[73] Assignees: Nippondenso Co., Ltd., Kariya City; Chubu Sukegawa Enterprise Co., Ltd., Nagoya City, both of Japan

[21] Appl. No.: 757,600

[22] Filed: Sep. 11, 1991

[30] Foreign Application Priority Data

Sep. 12, 1990 [JP] Japan .................................. 2-243395

[51] Int. Cl.⁵ ............................................. B29C 45/20
[52] U.S. Cl. ............................... 425/190; 264/328.15; 425/192 R; 425/549
[58] Field of Search ................... 254/549, 190, 192 R; 264/328.15

[56] References Cited

U.S. PATENT DOCUMENTS

| | | | |
|---|---|---|---|
| 4,422,841 | 12/1983 | Alfonsi et al. | 425/549 |
| 4,662,837 | 5/1987 | Anderson | 425/549 |
| 4,755,126 | 7/1988 | Lenerenz | 425/549 |
| 4,787,836 | 11/1988 | Osuna-Diaz et al. | 425/549 |

FOREIGN PATENT DOCUMENTS

| | | | |
|---|---|---|---|
| 61-59219 | 12/1986 | Japan | 45/26 |
| 63-202418 | 8/1988 | Japan | 45/27 |

*Primary Examiner*—Tim Heitbrink
*Attorney, Agent, or Firm*—Cushman, Darby & Cushman

[57] ABSTRACT

A hot runner injection molding machine which injects a melt into a cavity formed by a front mold and a movable rear mold. The injection molding machine includes a runner device fixed to a fixed head, gate devices which form orifices through which the melt is injected into the cavity, and heaters for heating the gate devices and detachably attached to the runner device. The gate devices and the heaters can be changed in accordance with the type of molds to be used, without removing or dismantling the runner device, and therefore, the same runner device can be commonly used for different types of molds.

20 Claims, 5 Drawing Sheets

HOT RUNNER INJECTION MOLDING MACHINE

BACKGROUND OF THE INVENTION

1. Field of the Invention

The present invention relates to a hot runner injection molding machine equipped with heaters for heating an injection molding compound in an injection passage, to keep the compound in a molten condition.

2. Description of the Related Art

An injection molding machine equipped with heaters for heating an injection passage (hereinafter called "runner") for a melted injection molding compound (hereinafter called "a melt") to be injected into the cavity is commonly used for manufacturing plastic products.

In this type of injection molding machine, usually a runner is disposed within a front mold, and heaters for heating the runner are also installed within the front mold. By this arrangement, the melt in the runner can be maintained in a melted condition even when the melt is injected into the cavity.

This type of injection molding machine is disclosed, for example, in Japanese Examined Patent Publication No. 61-59219.

In this type of injection molding machine, however, each front mold is equipped with its own built-in heaters and runners, and therefore, the cost of manufacturing the front mold becomes higher.

Japanese Unexamined Patent Publication No. 63-202418 discloses another type of injection molding machine, in which a runner device having a passage for a melt is provided separately and fixed to a fixed head of the injection molding machine.

This arrangement allows a single runner device to be utilized for different front molds, and thus the cost of manufacturing the front mold can be reduced.

Even in this case, however, it is difficult to change the nozzle (or gate) without removing the runner device.

Consequently, when it is necessary to change the length of the nozzle (or gate) in accordance with the type of front mold, the runner device must be removed, or the whole runner device including the nozzle (or gate) must be changed.

SUMMARY OF THE INVENTION

An object of the present invention is to solve the aforementioned problems by providing a hot runner injection molding machine by which the nozzle (or gate) can be easily changed without removing the runner device, and to increase the versatility of the injection molding machine by enabling a common use of the runner device for different type front molds.

According to the present invention there is provided a hot runner injection molding machine comprising: a fixed head, to which a front mold is detachably attached; a runner device fixed to said fixed head between said front mold and said fixed head, to provide a passage through which the melt is injected into a cavity formed by said front mold and a movable rear mold; a gate means detachably attached to said runner device for providing an orifice through which said melt is injected into said cavity; and, at least a heater means detachably attached to said runner device for heating said gate means; whereby said gate means and said heater means can be changed according to the type of the front mold without removing said runner device from said fixed head.

The present invention will be better understood from the description of preferred embodiments thereof as set forth below, with reference to the accompanying drawings.

DESCRIPTION OF PREFERRED EMBODIMENTS

Figure 1:
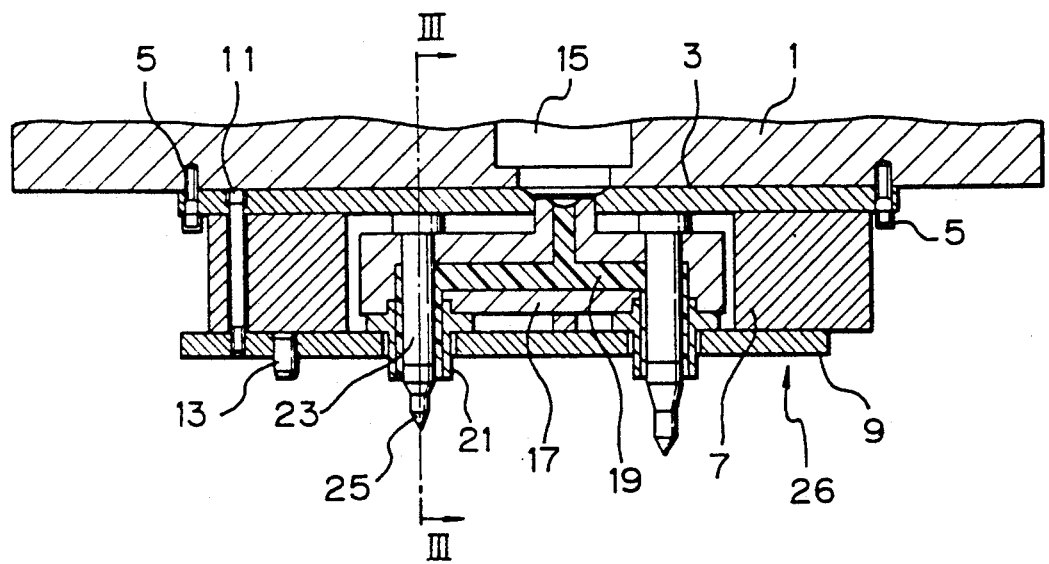
FIG. 1 is a sectional view of the main part of the fixed head and the runner device of an embodiment of the present invention.

FIG. 1 is a sectional view of a main part of one embodiment of the present invention.

Referring to FIG. 1, reference numeral 1 represents a fixed head made of steel, and numeral 26 represents a runner device fixed to the fixed head 1 by bolts 5.

In this embodiment, the runner device 26 includes a steel mounting plate 3 fixed to the fixed head 1 by bolts 5, a spacer block 7, also made of steel, and another steel mounting plate 9. The mounting plate 9 and the spacer block 7 are attached to the mounting plate 3 by bolts 11 and a guide pin 13 is provided on the mounting plate 9.

Reference numeral 15 represents an adaptor hole for a nozzle of an injection unit, not shown in the drawing.

The runner device 26 also includes a steel runner block 17, which is provided with a runner 19 serving as a passage for a melt.

Sprue bushes 21 are provided and attached to the runner block 17, to prevent a leakage of the melt to the outside.

Numerals 23 and 25 represent torpedoes, which together with the sprue bush 21 form gates for allowing a melt to be injected. The torpedoes 23 and 25 are made of beryllium-copper alloy, or of steel, and the annular clearance between the torpedoes 23, 25 and the sprue bush 21 forms the gate through which the melt is injected.

Figure 3:
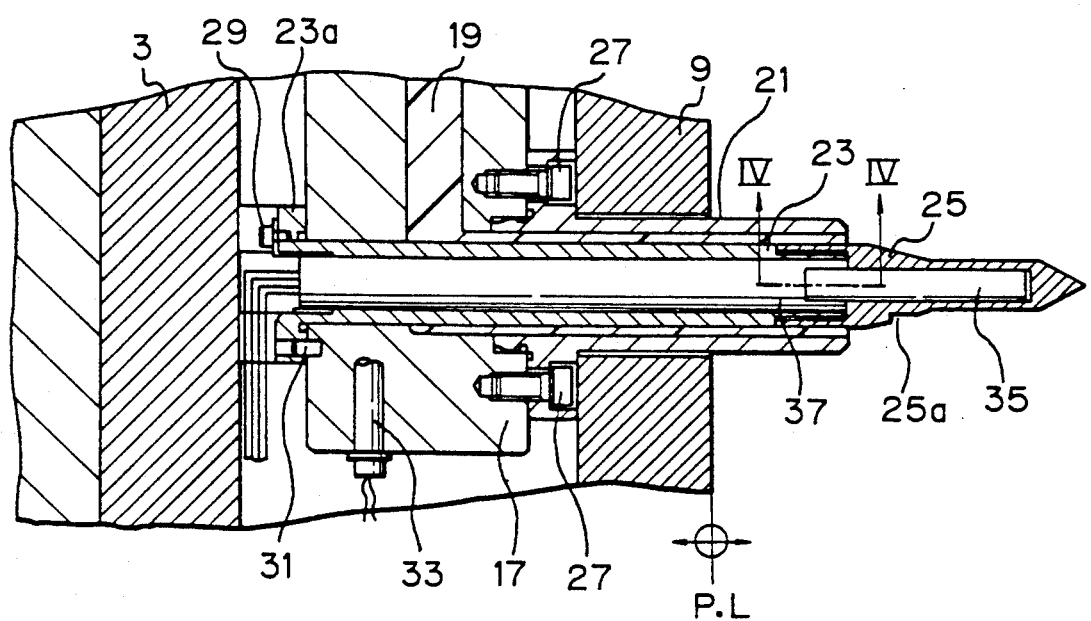
FIG. 3 is an enlarged sectional view taken along the line III—III in FIG. 1.

FIG. 3 is an enlarged sectional view taken along the line III—III, and shows the details of the gate portion of the embodiment.

Referring to FIG. 3, the sprue bush 21 is attached to the runner block 17, the torpedoes 23 and 25 are connected to each other by a threaded connection, and a flange portion 23a at the base of the torpedo 23 is held between the mounting plate 3 and the runner block 17, whereby the torpedo 23 is fixed to the runner block 17.

A bolt 29, which prevents the heater 37 from falling off, is provided on the flange portion 23a. Also, a lock pin 31 is provided on the flange portion 23a of the torpedo 23, to prevent a relative rotation between the torpedo 23 and the runner block 17.

Flat portions 25a are provided on a part of peripheral portion of the torpedo 25, to facilitate a turning of the torpedo 25 when using a wrench for assembling and disassembling same.

Numeral 33 denotes an electrical heater for the runner block 17, which is supplied with power by an electrical source, (not shown), to heat the runner block 17 so that the molten condition of the melt (i.e., an injection molding compound) is maintained.

Also, torpedoes 23 and 25, as a part of the gate portion, are heated by cartridge type electrical heaters 35 and 37 built-in to the torpedoes 23 and 25, to also maintain the molten condition of the melt. The heaters 35 and 37 are detachably connected to each other and function as a single heater.

Figure 4:
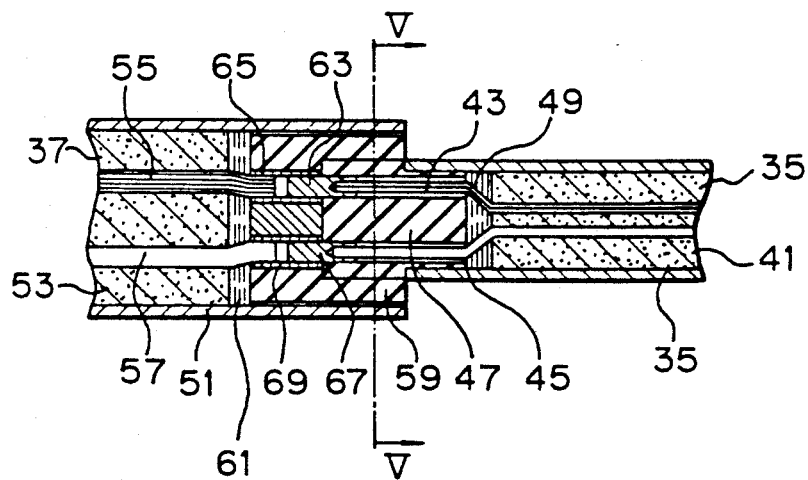
FIG. 4 is an enlarged sectional view taken along the line IV—IV in FIG. 3, and showing details of the heaters.

FIG. 4 is an enlarged sectional view taken along the line IV—IV in FIG. 3, and showing details of the heaters 35, 37 and the connection thereof. As shown in FIG. 4, the heater 35 comprises a cylindrical casing 39 made of stainless steel, in which a heating wire 43 and a lead wire 45 for a thermocouple are contained. The inside of the casing 39 is filled with magnesium oxide powder 41, and the open end of the casing 39 is covered with an insulation material, such as a ceramic insulator 47, in this embodiment. A seal member 49 made of a material similar to magnesium oxide is provided between the ceramic insulator 47 and the magnesium oxide powder 41, to prevent a possible leakage of the magnesium oxide powder 41.

The ends of the heating wire 43 are connected respectively to cylindrical plug type terminals 63 made of nickel, which protrude from the insulator 47. Similarly, the lead wires are connected to cylindrical plug type terminals 67, which also protrude from the insulator 47.

The heater 37 has the same construction as that of the heater 35, and contains a heating wire 55, lead wires 57 for the thermocouple, a ceramic insulator 59 a seal member 61, and magnesium oxide powder 53 a stainless steel casing 51. Here, however, the terminals 65 and 69 for the heating wire 55 and the lead wire 57 for the thermocouple are a hollow cylindrical socket type, to facilitate the connection of the heating wires 43 and 55 and the lead wires 45 and 55, by inserting the plug type terminals 63 and 67 of the heater 35 into the socket type terminals 65 and 69 of the heater 37, respectively.

The insulator 59 is also provided with a recess for receiving the insulator 47, to thus facilitate a firm connection.

Figure 5:
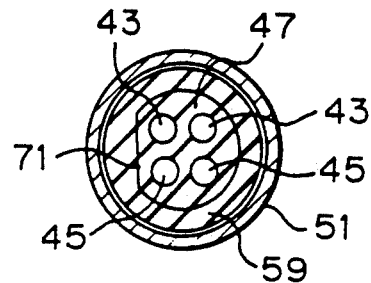
FIG. 5 is a sectional view taken along the line V—V in FIG. 4.

FIG. 5 shows a cross sectional view taken along the line V—V in FIG. 4.

As shown in FIG. 5, flat portions 71 are provided on the inner wall surface of the insulator 59 and periphery of the insulator 47, to ensure a proper connection of the terminals.

Figure 2:
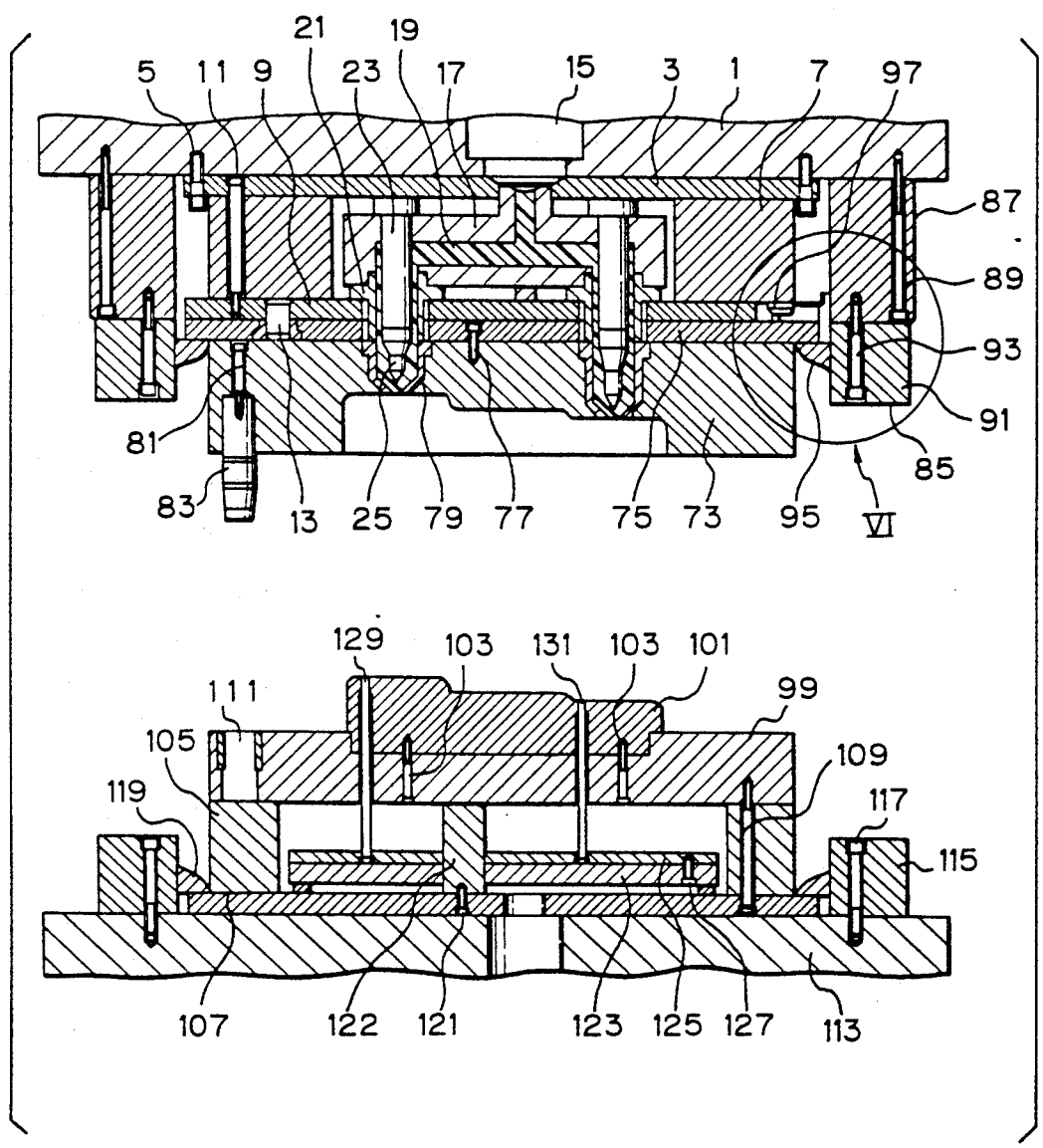
FIG. 2 is a sectional view similar to FIG. 1, but including the front mold and the rear mold nd associated parts.

FIG. 2 illustrates the main part of the embodiment shown in FIG. 1, when assembled.

Referring to FIG. 2, the front mold 73 is attached to the runner device 26 by clamp devices 85, and confronts the movable rear mold 99. In the figure, numeral 75 represents a mounting plate attached to the steel front mold 73 by bolts 77, and 79 denotes the sprue bush built-in to the front mold 73. A bolt 81 fastens the guide pin 83 to the front mold 73.

The clamp devices 85 consist of steel blocks 87 and 91 fastened to the fixed head 1 by bolts 89 and 93 and provided with clamp portions 95, to thus fix the front mold 73 and mounting plate 75 to the fixed head 1 holding the runner device 26 therebetween.

A limit switch 97 is disposed on the spacer block 7, for detecting the presence of the front mold 73.

Figure 6:
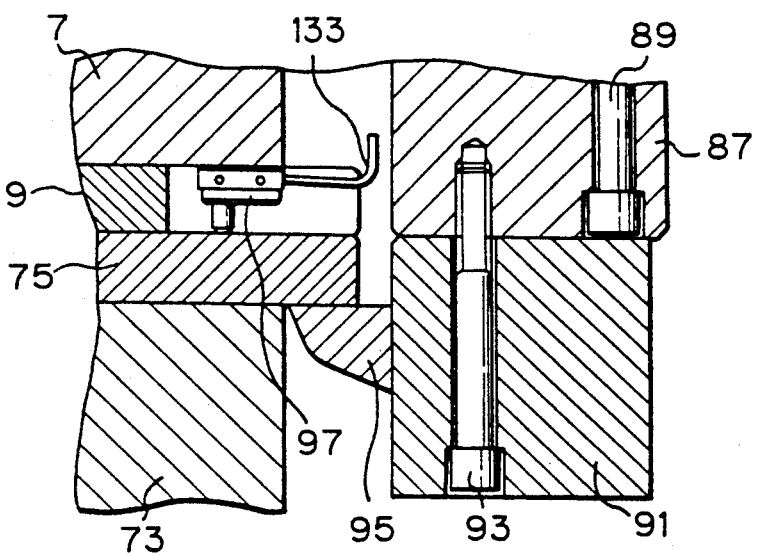
FIG. 6 is a enlarged sectional view drawing illustrating the details of the part denoted by the circle VI in FIG. 2.

FIG. 6 shows details of the portion indicated by the circle VI in FIG. 2. As shown in FIG. 6, when the detecting tip of the limit switch 97 comes into contact with the front mold 73, a signal is fed to a control circuit of the injection molding machine (not shown) through a lead wire 133. If an appropriate signal is not fed to the control circuit, the control circuit determines that the front mold is not attached (or not properly attached) to the mounting plate 9, and shuts off the supply of electricity to heaters 35 and 37.

Referring to FIG. 2 again, numeral 101 denotes a core attached to the rear mold 99. The core 101 forms a part of the rear mold 99, and the cavity to which a melt is injected is formed between the core 101 and the front mold 73. The rear mold 99 is fastened to a steel mounting plate 107 by spacer blocks 105 and bolts 109. A guide hole 111 is disposed in the rear mold 99 at the location confronting the guide pin 83 of the front mold. Clamp devices 115 made of steel and having clamp portions 119 are fixed to a movable platen 113 by bolts 117, and by tightening the bolt 117, the mounting plate 107 can be fixed to the movable platen 113 by the clamp portions 119.

Numerals 129 and 131 represent ejector pins for removing products from the mold. The ejector pins 129 and 131 are held by ejector pin plates 123 and 125 connected to each other by bolts 127. A guide pin 122 is fixed to the mounting plate 107 to provide a guide for the ejector pin plates 123 and 125.

The operation of the hot runner injection molding machine according to the embodiment is now explained in detail.

In this embodiment, the runner device 26 is always fixed to the fixed head 1 by bolts 5 as shown in FIG. 1, and the front mold 73 is attached to the runner device 26. The front mold 73 is positioned on the runner device 26 by the guide pin 13, and is firmly fixed by the clamp device 85 to the fixed head 1 while holding the runner device 26 therebetween.

Then the rear mold 99 is moved forward toward the front mold, to close the mold, and during this movement, the rear mold 73 is guided and positioned by the guide pin 83 and the guide pin hole 111. When the mold is completely closed, the front mold 73 and the rear mold 99 are in contact with each other and a cavity is formed between the core 101 and the front mold 73. After the mold is closed, a melt (i.e., an injection molding compound in the molten condition) is injected into the runner 19 from the nozzle of the injection unit (not shown).

The melt is injected into the cavity through the runner 19 and the annular clearance formed by the sprue bushes 21, 79 and the torpedoes 23, 25, and thus the product is formed within the cavity.

After repeating the above procedure a required number of times, to produce one type of product, if another type of product for which a different type rear mold 99 and core 101 are used, must be produced, the torpedoes and the sprue bushes can be changed according to the type of the rear mold 73 and the core 101, by the following procedures.

First, the front mold 73 is removed from the fixed head 1. In this embodiment, the front mold 73 can be removed while leaving the runner device 26 on the fixed head 1, by loosening the bolts 93 of the clamp devices 85. When the front mold 73 is removed from the fixed head 1, the control circuit (not shown) detects the removal of the front mold 73, by a signal from the limit switch 97, and the electric power supply to the heaters 35, 37 is then shut off, to stop the heating. When the front mold 73 is removed, the runner device 26 is left on the fixed head 1 as shown in FIG. 1. In this condition the injection molding compound stuck to the periphery of the torpedo 25 is removed by a tool such as a pair of pliers. This process is preferably carried out when the torpedo is still hot and the injection molding compound is still relatively soft.

Then the torpedo 25 is removed from the torpedo 23 by turning it with a wrench. For this purpose, flat portions 25a with which the wrench is engaged are provided on the periphery of the torpedo 25. The torpedo 23 is not turned during the removal of the torpedo 25 since it cannot rotate due to the lock pin 31.

As shown in FIG. 3, the heater 35 is exposed when the torpedo 25 is removed from the torpedo 23, and therefore, the heater 35 can be pulled off from the heater 37 and another heater, which corresponds to the shape of the front mold to be used for the other type of the product, can be fitted to the heater 37 by using the plug and socket type connection explained before. Also, another torpedo corresponding to the shape of the front mold is fitted to the torpedo 23, using the threaded connection. After changing the other torpedoes of the running device, if any, in the same manner as explained above, a front mold of a different shape is fixed to the runner device 26 and the fixed head using the clamp device 85. The rear mold including the core is also changed according to the type of product. Then the same production processes as explained before are carried out, to form another type of product.

It will be understood from the explanation above that, according to this embodiment, the torpedo 25 which forms a gate, can be easily changed to another type of torpedo because it is fitted to the torpedo 23 by a threaded connection, and the heater 35 also can be easily changed to another type of heater because it is fitted to the heater 37 by a plug and socket type connection formed by the ceramic insulations 47 and 59.

Consequently, the torpedo and the heater can be changed according to the type of front mold without removing or dismantling the runner device 26. Namely, the same runner device can be used for different type front molds by changing the torpedoes (i.e., gate portion) only.

Also, when the front mold 73 is removed from the fixed head 1, it is detected by the limit switch 97 and the electric power supply to the heaters is shut off. Therefore, the danger of incidental burns or electrical shocks received by the operator is completely eliminated.

Figure 7:
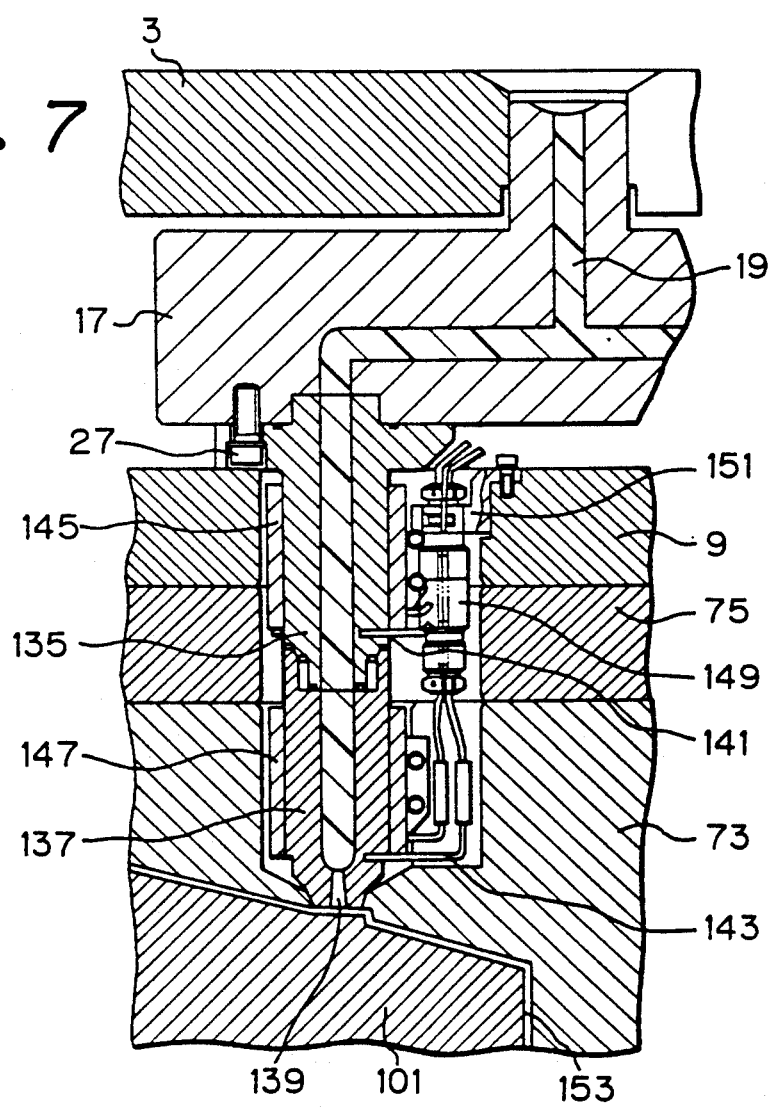
FIG. 7 is a sectional view illustrating main parts of another embodiment of the present invention.

Another embodiment of the present invention is now explained with reference to FIG. 7. In FIG. 7, parts similar to those of FIG. 1 are indicated by the same reference numerals.

In the drawing, numerals 135 and 137 represent sprue bushes detachably connected to each other by a threaded connection. In this embodiment, the tip portion of the sprue bush 137 forms a gate portion 139 including an orifice through which the melt supplied through the runner 19 is injected into the cavity 153. Thermocouples 141 and 143 are provided to detect the temperatures of the sprue bushes 135 and 137 respectively, and band type electrical heaters 145 and 147 are provided to heat the sprue bushes 135 and 137, respectively.

The thermocouple 143 and the band type heater 147 are connected to a metal connector 149 used in common with the thermocouple 141 and the band type heater 145 of the sprue bush 135. The metal connector 149 is attached to the mounting plate 9 by a bracket 151. The sprue bush 137 can be removed from the sprue bush 135 by loosening the threaded connection therebetween. Also, the thermocouple 143 and the heater 147 can be removed by disconnecting the metal connector 149.

Therefore, the sprue bush 137, the thermocouple 143 and the heater 147 can be changed according to the type of front mold without removing or dismantling the runner device 26. Consequently, also in this embodiment, the same runner device 26 can be used for different front molds.

The substantial difference between this embodiment and the embodiment explained before is that the injection molding compound is heated from outside of the sprue bushes 135 and 137.

The thermocouples 141 and 143 are used for controlling the heaters 145 and 147 so that the injection mold compound is maintained at a suitable temperature.

Figure 8:
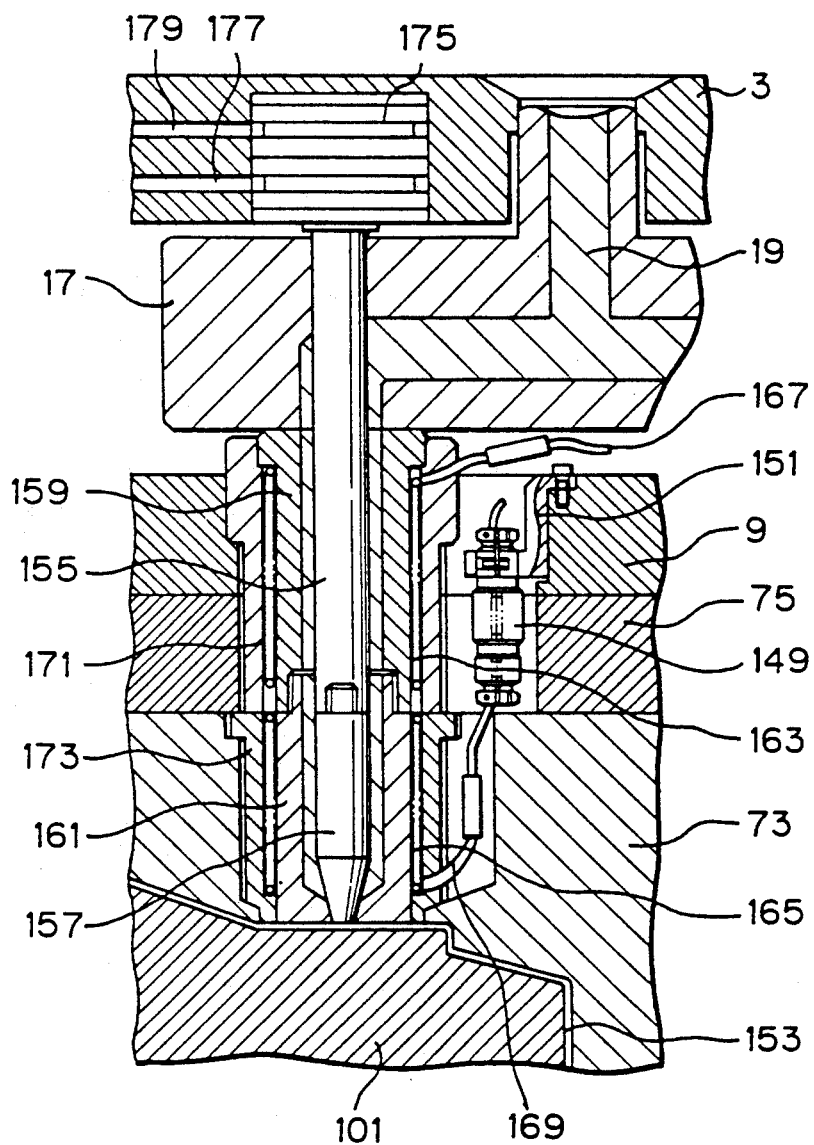
FIG. 8 is a sectional view illustrating main parts of still another embodiment of the present invention; and, FIG. 9 is a sectional view illustrating main parts of a further embodiment of the present invention.

FIG. 8 shows another embodiment of the present invention which is applied to a valved gating mold type front mold.

Also, in this drawing, parts similar to those of FIG. 1, 2 and 7 are indicated by the same reference numerals.

In this embodiment, a shut off pin 157, which closes the gate, is fitted to another shut off pin 155 by a threaded connection. An inner sprue bush 161 is also fitted to another inner sprue bush 159 by a threaded connection, and an outer sprue bush, split into two parts 171 and 173, is provided outside of the inner sprue bushes 159 and 161. Heaters 163 and 165 for heating the inner sprue bushes 159 and 161 are located in the clearance between the inner sprue bushes 159, 161 and the outer sprue bush, and are connected to the electrical source by a lead 167 and a metal connector 149, respectively. A hydraulic cylinder 175 is provided to move the shut off pins 155 and 157 up and down, to thus open and shut the gate. Operating fluid is supplied to the hydraulic cylinder 175 through passages 177 and 179, from a hydraulic control unit (not shown in the drawing).

Figure 9:
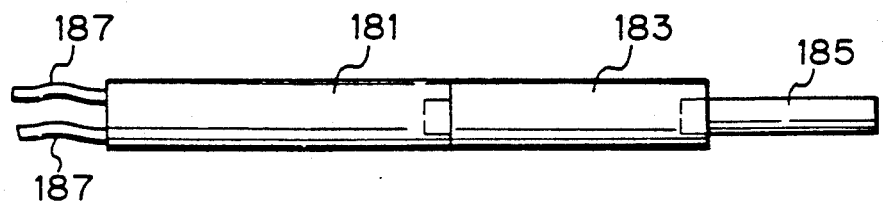

FIG. 9 shows another embodiment of the present invention. This embodiment is identical to the embodiment shown in FIG. 1 and the only exception thereto is the heaters. Therefore, only that difference, i.e., of the heaters, is explained here.

In this embodiment, three heaters 181, 183, 185 are used instead of the two used in the preceding embodiment. The heaters 181 and 183, 183 and 185 are connected by plug and socket connections, as explained before, and the electric power is supplied thereto by leads 187. More than three heaters, such as four or five heaters, can be used in a similar construction. In this arrangement, the heater 185 can be directly connected to the heater 181, and therefore, the length of the heater assembly can be changed by using the same elements 181, 183, 185.

Although the above embodiments are explained for use with a melted injection molding compound, the application of the present invention is not limited to a thermoplastic compound but can be applied to other materials such as a thermoset compound, melted rubber, and melted ceramics.

Also, although the above embodiments are explained with regard to runner devices having two torpedoes, it will be understood that the present invention also can be applied to other runner devices having a different numbers of torpedoes, as required by the shape of the products.

Therefore, it should be understood that various changes and modifications can be made without departing from the scope and spirit of the present invention.

We claim:

1. A hot runner injection molding machine which injects a melt into a cavity formed by a front mold and a movable rear mold comprising:
   a fixed head, to which said front mold is detachably coupled;
   a runner device attached to said fixed head between said front mold and said fixed head, to provide a passage through which said melt is injected into said cavity;
   at least a gate means detachably coupled to said runner device, for providing an orifice through which said melt is injected into said cavity; and
   at least a heater means detachably coupled to said runner device for heating said gate means;
   wherein each of said gate means and said heater means include respective base portions fixed to said runner device, and respective end portions detachably connected to said respective base portions at a position adjacent to a face of the runner device that contacts said front mold.
   wherein at least said respective end portions protrude from said face of the runner device when said front mold is removed, whereby said respective end portions can be changed according to the type of front mold without removing said runner device from said fixed head.

2. A hot runner injection molding machine according to claim 1, wherein said heater means are electrical heaters connected to an electric power source by socket and plug connections.

3. A hot runner injection molding machine according to claim 2, wherein said electrical heaters are connected to other electrical heaters fixed to said runner device by said socket and plug connections, whereby said electrical heaters are electrically connected to said electric power source via said other electrical heaters.

4. A hot runner injection molding machine according to claim 1, wherein each of said gate means comprises a torpedo and said melt is injected into said cavity through an annular passage formed between said torpedo and a surrounding wall surface.

5. A hot runner injection molding machine according to claim 4, wherein said heating means are electrical heaters and are contained in a cavity formed within said torpedo.

6. A hot runner injection molding machine according to claim 5, wherein said electrical heaters are connected to an electric power source by socket and plug connections.

7. A hot runner injection molding machine according to claim 6, wherein said electrical heaters are connected to other electrical heaters fixed to said runner device by said socket and plug connections, whereby said electrical heaters are electrically connected to said electric power source via said other electrical heaters.

8. A hot runner injection molding machine according to claim 1, wherein each of said gate means comprises a nozzle having an orifice through which said melt is injected into said cavity.

9. A hot runner injection molding machine according to claim 8, wherein said eating means are band electrical heaters surrounding an outer surface of said nozzle.

10. A hot runner injection molding machine according to claim 9, wherein said band electrical heaters are connected to an electric power source by socket and plug connections.

11. A hot runner injection molding machine according to claim 10, wherein said band electrical heaters are connected to other electrical heaters fixed to said runner device, by said socket and plug connections, whereby said band type electrical heaters are electrically connected to said electric power source via said other electrical heaters.

12. A hot runner injection, molding machine, according to claim 1, wherein said and portion of said gate means is detachably mounted to said base portion by a threaded connection.

13. A hot runner injection molding machine according to claim 12, wherein each of said gate means comprises a torpedo and said melt is injected into said cavity through an annular passage formed between said torpedo and a surrounding wall surface.

14. A hot runner injection molding machine according to claim 13, wherein said heating means are electrical heaters contained in a cavity formed within said torpedo.

15. A hot runner injection molding machine according to claim 14, wherein said electrical heaters are connected to an electric power source by socket and plug connections.

16. A hot runner injection molding machine according to claim 15, wherein said electrical heaters are connected to other electrical type heaters fixed to said runner device, by said socket and plug connections, whereby said electrical heaters are electrically connected to said electric power source via said other electrical heaters.

17. A hot runner injection molding machine according to claim 12, wherein each of said gate means comprises a nozzle having an orifice through which said melt is injected into said cavity.

18. A hot runner injection molding machine according to claim 17, wherein said heating means are band electrical heaters surrounding an outer surface of said nozzle.

19. A hot runner injection molding machine according to claim 18, wherein said band electrical heaters are connected to an electric power source by socket and plug connections.

20. A hot runner injection molding machine according to claim 19, wherein said band electrical heaters are connected to other electrical heaters fixed to said runner device, by said socket and plug connections, whereby said band electrical heaters are electrically connected to said electric power source via said other electrical heaters.

* * * * *